Figure 1:
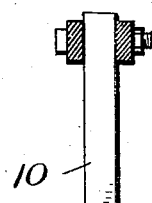

S. L. ALLEN.
BLADE FOR CULTIVATORS AND SIMILAR AGRICULTURAL IMPLEMENTS.
APPLICATION FILED MAR. 2, 1905.

898,419.

Patented Sept. 15, 1908.

WITNESSES:
F. C. Barry
Edw. W. Vaill Jr.

INVENTOR:
Samuel L. Allen
by
ATTORNEY:

UNITED STATES PATENT OFFICE.

SAMUEL L. ALLEN, OF MOORESTOWN, NEW JERSEY.

BLADE FOR CULTIVATORS AND SIMILAR AGRICULTURAL IMPLEMENTS.

No. 898,419.

Specification of Letters Patent.

Patented Sept. 15, 1908.

Application filed March 2, 1905. Serial No. 248,059.

*To all whom it may concern:*

Be it known that I, SAMUEL L. ALLEN, a citizen of the United States, and a resident of Moorestown, county of Burlington, State of New Jersey, have invented certain new and useful Improvements in Blades for Cultivators and Similar Agricultural Implements, of which the following is a full, clear, and complete disclosure.

The main object of my invention is to produce a blade, or tooth for cultivators, and similar agricultural implements, used for cutting or turning earth, which will be strong and rigid at points subjected to the greatest wear and strain, and which will have practically no tendency to become blunt or bent at the cutting edges, as has heretofore been the case in similar tools.

With this and other objects in view, my invention consists in the construction set forth in the following description and accompanying drawings, in which like reference characters refer to corresponding parts.

Figure 2:
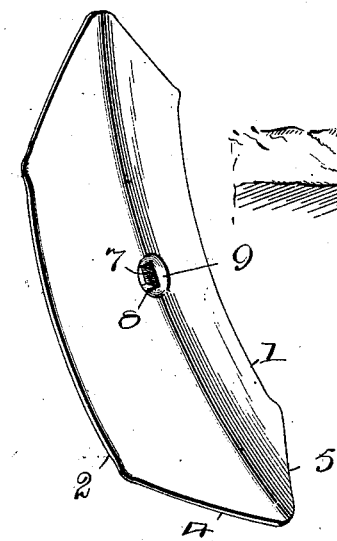
Figure 3:
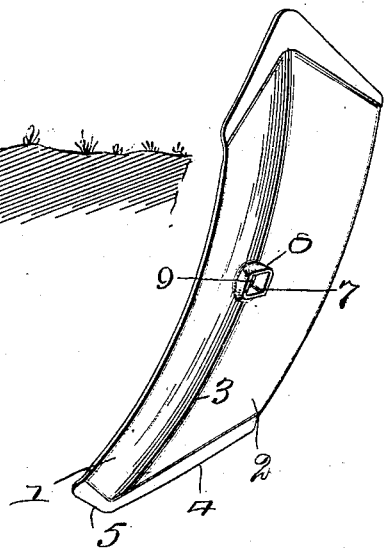

In the drawings: Figure 1 is a side elevation of my improved blade attached to its supporting bar, and showing its operative or cutting relation with the earth or ground; Figs. 2 and 3 are respectively front and rear perspective views of my improved blade, and Figs. 4 and 5 are respectively longitudinal and transverse sectional views thereof.

Figure 4:
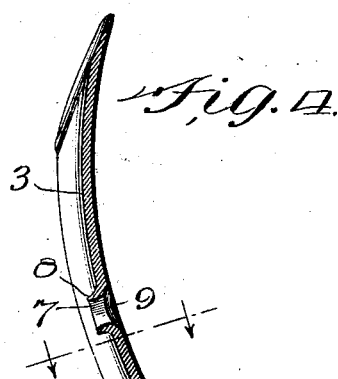
Figure 5:
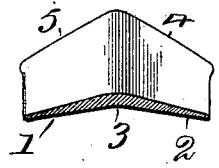

Referring to the drawing, the cultivator blade therein shown comprises a piece of steel or other similar material, which is curved longitudinally, substantially as shown in Fig. 4 and which is also bent on a transverse line forming an obtuse angle between the two longitudinal portions or sides, 1 and 2, of the blade, as indicated in Fig. 5. These longitudinal sides of the blade are thicker at the central portion of the blade, as indicated at 3, and preferably gradually taper toward their outer edges.

The edges 4 and 5 of the blades converge into a blunt point 6', thus forming wedge or V-shaped extremities. Terminating in these edge portions 4 and 5 and on the under side of the same are the riding or wearing surfaces indicated at 4', 5' and 6', as shown in Figs. 3 and 4. These wearing or riding surfaces run around the under marginal edges of the wedge-shaped portion, and form a junction surface between the front and rear surfaces of the blade. When fixed in position, as shown in Fig. 1, the wedge or V-shaped portion at the lower end of the blade extends downwardly and forwardly, and has its sides 1 and 2 flaring rearwardly, and its riding surface above described extending upwardly and rearwardly from the ground. In this position, the edges 4 and 5 cut the soil, causing a portion thereof to pass upwardly along the front surface of the blade, and then to spread laterally, due to the flaring of the sides 1 and 2. This portion of the soil is loose, and is displaced without much difficulty, but that which passes beneath the cutting surfaces 4 and 5 does not become loosened until it has passed to the rear of the wearing or riding surface indicated at 4', 5' and 6', after which it falls back to its normal position. The friction exerted by the soil passing under the wearing or riding surface, due to the upward and rearward inclination of the riding surface, grinds away the latter, the resulting surface, however, being inclined in such a direction that the edges 4 and 5 remain sharp, and do not become dull due to the result of their continuous use. A transverse section taken at right angles to the plane of this riding surface and near the point thereof, indicated at 6', would represent substantially the outline of a triangle, of which the base is the wearing or riding surface and the other two sides the front surface of the wedge-shaped portion, but any transverse section taken through the portion 4' or the portion 5' of the riding surface, at right angles thereto, would represent a figure, the base portion of which would be the riding surface and one of its other sides would represent that part of the front of the wedge portion over the riding surface, which side would taper downwardly until it terminated in an edge with the riding surface. Thus the riding surface forming the under side of the front of the marginal portion becomes thicker in proportion to its approach to the middle or longitudinal curved line passing through the vertical axis of the blade, and likewise, the side portions 1 and 2 become thicker as they approach this longitudinal axis, as shown in Fig. 5. The soil which passes upwardly in front of the blade during its operation, as illustrated in Fig. 1, causes a greater wear on the middle of the front surface, and a less wear as it passes laterally therefrom over the side portions, in proportion to the difference in thickness substantially between that of the middle portions and the tapering side portions. This grinding action wears away the surface to a greater degree at the apex or point of the wedge-shaped portion than it does on the receding edges 4 and 5, and the said wearing is in proportion to the increasing thickness of the metal rearwardly from the edges of the said wedged-shaped portion. The ends of the blade are made symmetrical so that the same may be reversed upon its central support or fastening means, so that either of the ends of the blade may be utilized when the opposite one becomes blunt or dull.

For attaching the blade to its support, I may use a bolt or rivet 6, or similar means, which preferably has a portion of its shank made square to correspond to a square hole in the blade, as indicated at 7. This hole 7 is preferably made by forcing or punching the metal of the blade downwardly forming a sleeve 8 for the bolt integral with the body of blade, and at the same time countersinking the bearing face of the blade to form a recess 9 to receive the head of the bolt or rivet 6, for connecting the blade to its supporting bar 10.

Having thus described my invention, it will be seen that I have produced a cultivator blade in which the metal is efficiently distributed, giving maximum strength for a given weight of metal, and which also tends to prevent the edge or point of blade which takes the brunt of the wear as it enters the ground, from becoming blunted, rounded or bent, owing to the great amount of wear upon said point and the great force exerted upon it. Moreover, since the point of the tooth is provided with more metal and since the sides of the tooth are of varying thickness in a direction away from the central longitudinal line of the blade, the wearing effect of the soil upon the blade is evenly compensated for, thus producing a blade which does not require to be sharpened as do the ordinary forms of blades, since the shape of the cutting edge of the blade is maintained substantially uniform.

Having thus described my invention, what I claim and desire to protect by Letters Patent of the United States, is:

1. A cultivator blade having two side portions extending longitudinally of the blade and meeting to form a transverse convex and longitudinally concave front, and a transversely concave and longitudinally convex back to the blade, said sides tapering in thickness gradually from their line of meeting to their outer edges, the under surface of the cutting end being substantially V shaped, and extending from the front edges of the tool rearwardly and upwardly with respect to the face of the tool.

2. A cultivator blade having the under surface of the cutting end formed substantially V-shaped, with the legs of the V tapering or of diminishing thickness in a direction away from the apex thereof.

3. A cultivator blade provided with a cutting end, the under surface of which end extends from the front edges of the tool rearwardly and upwardly with respect to the face of the tool, said under surface being substantially V-shaped, with the legs of said V diminishing in thickness in a direction away from the apex.

In witness whereof, I have hereunto set my hand and seal this first day of March, 1905.

SAMUEL L. ALLEN. [L. S.]

Witnesses:
 ALEXANDER PARK,
 A. L. JACOBY.